United States Patent [19]

Jellesma

[11] 4,152,082
[45] May 1, 1979

[54] DEVICE FOR DRIVING AN AGITATOR, MORE PARTICULARLY AN AERATOR FOR WASTE WATER

[75] Inventor: Anne Jellesma, Sneek, Netherlands

[73] Assignee: Machinefabriek W. Hubert & Co. B.V., Sneek, Netherlands

[21] Appl. No.: 792,407

[22] Filed: Apr. 29, 1977

[51] Int. Cl.² ............................................. B01F 7/16
[52] U.S. Cl. ....................................................... 366/342
[58] Field of Search .................. 74/412, 421; 366/264, 366/342, 343, 345, 287, 288

[56] References Cited

U.S. PATENT DOCUMENTS

| 3,208,734 | 9/1965 | Wood | 366/288 |
| 3,612,489 | 10/1971 | Abraham | 366/342 |
| 4,007,920 | 2/1977 | Plunguian et al. | 259/108 |
| 4,014,526 | 3/1977 | Cramer | 366/343 |

Primary Examiner—Robert W. Jenkins
Attorney, Agent, or Firm—Wilkinson, Mawhinney & Theibault

[57] ABSTRACT

A device for driving an agitator, in particular an aerator for waste water, wherein the agitator is coupled to the output shaft of the driving device, which output shaft in its turn, is coupled to a revolving table.

Said revolving table has an outer ring gear which is in engagement with the cogged wheel of a motor and also constitutes the outer ring of a revolving bearing the inner ring of which is carried by a rigidly supported, axially adjustable bridge.

9 Claims, 3 Drawing Figures

DEVICE FOR DRIVING AN AGITATOR, MORE PARTICULARLY AN AERATOR FOR WASTE WATER

The invention relates to a device for driving an agitator, more particularly an aerator for waste water, in which the agitator is coupled to the output shaft of the driving device.

An agitator of this type is known from actual practice. In this case the driving device comprises mostly a gear box with a number of reducing stages while also an adjusting mechanism for adjusting the height of the agitator is provided by means of which the immersion depth of the agitator in the waste water may be regulated. Such gear boxes, which comprise a large number of pinions of rather small diameter on shafts, are exposed to all kinds of shock loads in consequence of the often irregular flow of the waste water which often causes disturbances or gear toothbreakage.

It is the object of the invention to remove this disadvantage and to provide a driving device the construction of which is so strong that shock loads on the driving device cannot put it out of operation.

According to the invention, this object is achieved in that the outgoing shaft is coupled to a revolving table. This gives the possibility of supporting the revolving table near its outer edge, which allows the relative bearing then to have such a large diameter that impacts and shock loads can easily be absorbed and cannot affect the remaining portion of the driving device.

In a preferred embodiment of the invention the revolving table is provided with an outside ring-gear which is in engagement with the cogged wheel of a motor which is preferably an electric motor. The ring-gear constitutes then also the outer ring of a revolving bearing the inside ring of which is carried by a bridge. This bridge is rigidly supported but axially adjustable and it also carries the electric motor.

In another preferred embodiment of the invention, the bridge is supported by a number of screw jacks driven by a synchronous driving mechanism with which the height of the bridge with the ring-gear and the electric motor and which carries the aerator, may be simply adjusted.

The invention will now be explained more in detail, with reference to the drawings, of a specific embodiment, wherein.

Figure 1:
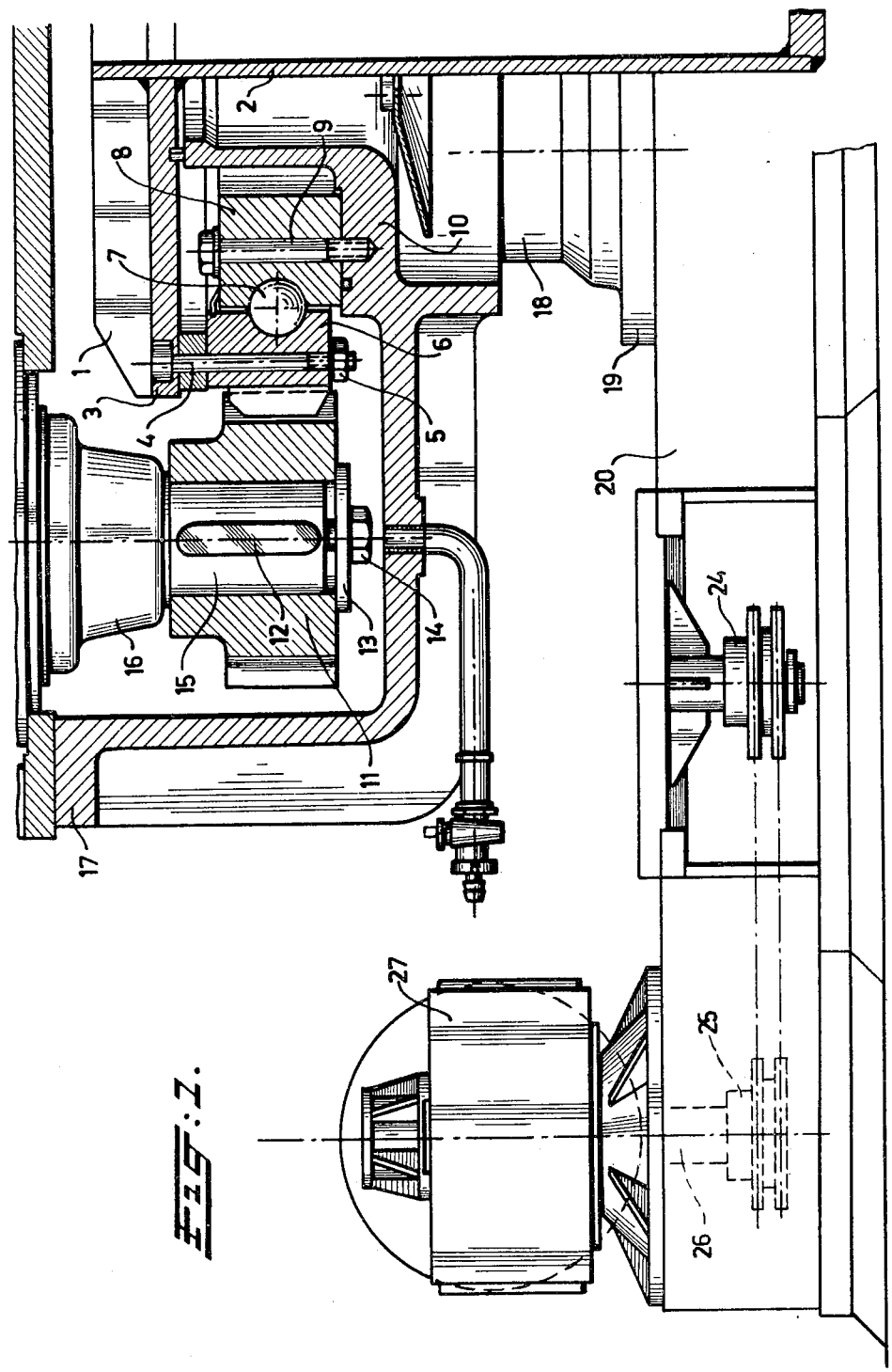
FIG. 1 is a side elevation with parts in cross-section to show details.
Figure 2:
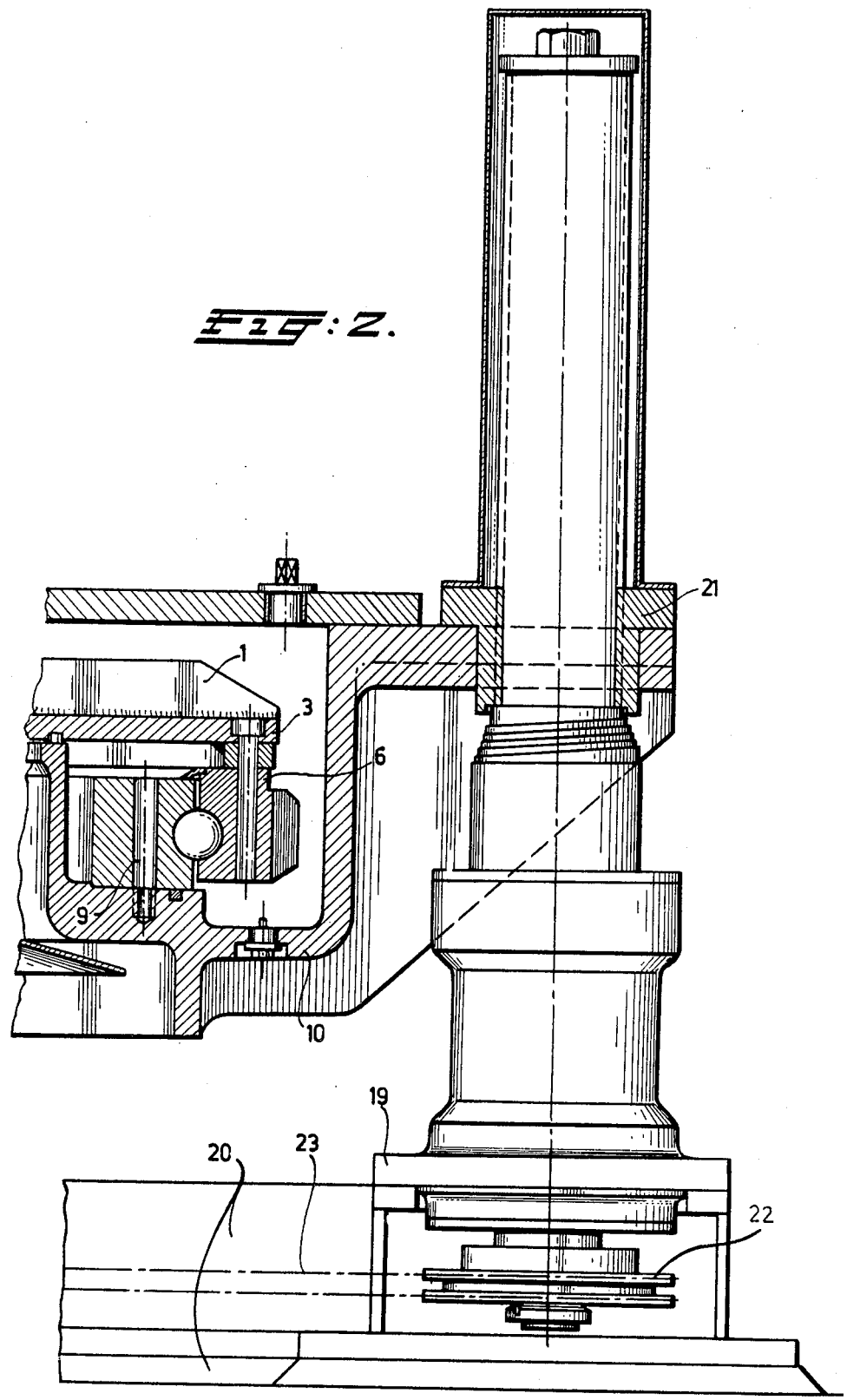
FIG. 2 is an enlarged view of a portion of the structure shown in FIG. 1.

According to the drawing and more particularly to FIGS. 1 and 2, the driving device comprises a revolving table 1 which carries a tubular output shaft 2. By means of a junction plate 3 and a number of coupling bolts 4 with nuts 5, a ring-gear 6 is coupled to the revolving table 1. This ring-gear 6, which may have a very large diameter which e.g. may be 1400 mm, also constitutes the outer ring of a revolving bearing with balls 7, the inner ring 8 of which is coupled to a bridge 10 by means of a number of screw bolts.

The ring-gear 6 is in engagement with a cogged wheel 11 which by means of a key 12 and a washer 13 is arranged on the shaft 15 of an electric motor 16 by means of an end nut 14. The electric motor is also carried on a bridge 10, namely on a bridge portion 17 located on a higher level. This bridge 10 cannot rotate, but it is supported axially adjustable by a number of jacks 18. These screw jacks 18 are connected, with the fixed portion 19, to a foundation 20, their movable portion 21 being coupled to the bridge 10. Below the foundation 20 each jack has a chain wheel 22 on which there runs a chain 23 which is shown schematically.

Figure 3:
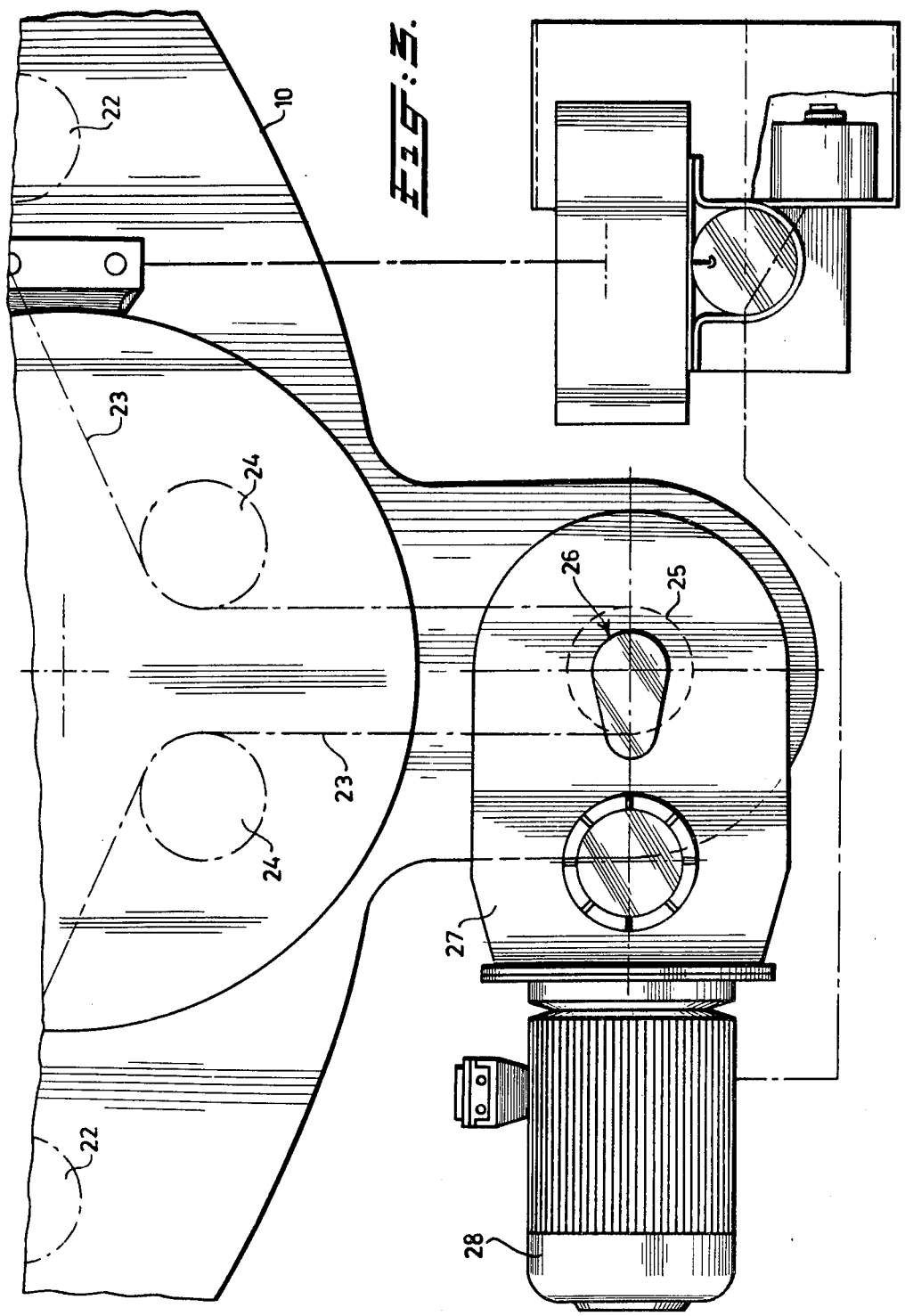
FIG. 3 is a top plan of the output shaft 26 and associated elements.

In FIG. 3 the course of the chain 23 is illustrated in top view. This chain runs around a number of chain wheels 22 and, a couple of idler wheels 24, and is led outwardly around the driven chain wheel 25. This driven chain wheel 25 is located on an output shaft 26 of a square gear box 27 which is driven by a horizontal electric motor 28. In use, the foundation 20 may be erected above a canal containing waste water to be purified. The agitator is vertically adjustable such that it can be immersed in the waste water to a variable depth due to which the aeration of the waste water may be varied. By the action of the electric motor 28, via the gear box 27, the output shaft 26 and the driven chain wheel 25, the chain is turned into one direction or the other due to which the chain wheels 22 of the screw jacks 18 are rotated so that the height of the bridge 10 and thus the immersion depth of the ventilator (not shown) may be adjusted.

The invention is not limited to the embodiment illustrated and described but encompasses all variants thereof.

What I claim is:

1. A driving device for an agitator, particularly an aerator for waste water comprising, a gear wheel transmission including an input shaft and driving means therefor and an output shaft couplable with an aerator; a revolving table; means including a gear tooth ring coupling said output shaft to said revolving table; a bridge including an inner ring and bearing balls operatively associated with said gear tooth ring, thereby providing a large diameter bearing relative to the diameter of the output shaft.

2. A device according to claim 1, characterized in that the revolving table further comprises an outer ring gear which is in engagement with a motor driven cogged wheel.

3. A device according to claim 2, characterized in that the ring gear further constitutes the outer ring of a bearing whose inner ring is carried by said bridge.

4. A device according to claim 3, wherein said bridge is axially adjustable and supports a motor.

5. A device according to claim 4, wherein said axially adjustable bridge is supported by a plurality of jack means.

6. A device according to claim 5, wherein said jacks are screw jacks; means synchronously driving said jacks whereby to provide uniform adjustment of said bridge.

7. A device according to claim 6, wherein said synchronous driving means comprises a driving wheel for each jack, an endless chain interconnecting said driving wheels and an adjusting motor driving said chain.

8. A device according to claim 7, wherein said jacks and said adjusting motor are supported upon a foundation and the movable portion of each said jacks is connected with said bridge.

9. A device according to claim 8, characterized in that said foundation is erected above a canal with waste water to be purified, said agitator being vertically adjustable such that it can be immersed in the waste water to a variable depth, as a result of which the aeration of the waste water may be varied.

* * * * *